United States Patent [19]

Doshi

[11] 4,398,926
[45] Aug. 16, 1983

[54] ENHANCED HYDROGEN RECOVERY FROM LOW PURITY GAS STREAMS

[75] Inventor: Kishore J. Doshi, Mahopac, N.Y.

[73] Assignee: Union Carbide Corporation, Danbury, Conn.

[21] Appl. No.: 371,285

[22] Filed: Apr. 23, 1982

[51] Int. Cl.$^3$ ................. B01D 53/04; B01D 53/22
[52] U.S. Cl. ................................. 55/16; 55/25; 55/68; 55/75; 55/158; 55/179; 55/389
[58] Field of Search ............... 55/16, 25, 26, 58, 62, 55/68, 75, 158, 389, 179, 387, 74

[56] References Cited
U.S. PATENT DOCUMENTS

| | | | |
|---|---|---|---|
| 3,324,626 | 6/1967 | Dresser et al. | 55/16 |
| 3,367,850 | 2/1968 | Johnson | 55/16 X |
| 3,430,418 | 3/1969 | Wagner | 55/25 |
| 3,986,849 | 10/1976 | Fuderer et al. | 55/25 |
| 4,172,885 | 10/1979 | Perry | 55/16 X |
| 4,229,188 | 10/1980 | Intille | 55/16 |
| 4,230,463 | 10/1980 | Henis et al. | 55/158 X |
| 4,238,204 | 12/1980 | Perry | 55/158 X |
| 4,255,591 | 3/1981 | Makin et al. | 55/16 X |

OTHER PUBLICATIONS

Simple Separation Systems for Hydrogen Recovery--Prism Separators by Monsanto.

*Primary Examiner*—Robert H. Spitzer
*Attorney, Agent, or Firm*—Alvin H. Fritschler

[57] ABSTRACT

A high pressure as stream having a hydrogen content of up to about 90 mol percent is passed to a separator containing a permeable membrane capable of selectively permeating hydrogen. The separator is used to achieve a bulk separation of the desired hydrogen from impurities contained in the gas stream. The separated hydrogen is recovered at a reduced pressure and is passed to a pressure swing adsorption system adapted for operation at said reduced pressure. The off-gas from the separator is recovered essentially at the higher pressure of the gas stream. A portion of the off-gas is throttled to a lower pressure, with appropriate power recovery, and is passed to the pressure swing adsorption system as a co-feed gas, thereby contributing to the recovery of purified hydrogen product and to a reduction in the operating costs for the desired hydrogen separation and purification. The remaining off-gas is recovered as a relatively high pressure fuel or feed gas for other purposes.

15 Claims, No Drawings

ENHANCED HYDROGEN RECOVERY FROM LOW PURITY GAS STREAMS

BACKGROUND OF THE INVENTION

1. Field of the Invention

The invention relates to the purification of hydrogen. More particularly, it relates to the purification of hydrogen present in high pressure gas streams containing a relatively high percentage of impurities.

2. Description of the Prior Art

The pressure swing adsorption (PSA) process provides a highly desirable means for separating and purifying hydrogen contained in a feed gas mixture thereof with impurities that are selectively adsorbed by one or more adsorbent beds in a PSA system. Adsorption occurs in such beds at a higher adsorption pressure, with the selectively adsorbable impurities thereafter being desorbed by pressure reduction to a lower desorption pressure. The beds may be purged at said lower pressure for further desorption and removal of impurities, if desired, before repressurization to the higher adsorption pressure for adsorption of impurities from additional quantities of the feed gas mixture as the processing sequence is carried out, on a cyclic basis, in each bed in the adsorption system.

The PSA process is commonly employed in multi-bed systems. The Wagner patent U.S. Pat. No. 3,430,418, discloses a PSA process and system employing at least four adsorbent beds arranged for carrying out a particular PSA processing sequence on a cyclic basis. This sequence includes higher pressure adsorption, cocurrent depressurization to intermediate pressure with release of void space gas from the discharge or product end of the bed, countercurrent depressurization to a lower desorption pressure, and repressurization to a higher adsorption pressure. Wagner teaches the passing of released void space gas from one bed directly to another bed initially at its lower desorption pressure. The pressure in the two beds is thereby equalized at an intermediate pressure. Additional void space gas can be released from the product end of the bed being cocurrently depressurized, with such void space gas being used to provide purge gas to another bed in the PSA system before such other bed is repressurized from its lower desorption pressure. After each bed had been repressurized to an intermediate pressure level by such pressure equalization, it is further repressurized from the intermediate level to its higher adsorption pressure, generally at least in part by the countercurrent addition of product effluent to the product end of the bed being repressurized.

In a further development in the art, the Fuderer patent U.S. Pat. No. 3,986,849, discloses the use of at least seven adsorbent beds, with the feed gas mixture being introduced to the feed end of at least two adsorbent beds, in overlapping identical processing cycles, at all stages of the PSA processing sequence. Each bed, in turn, undergoes three pressure equilization steps prior to repressurization to the higher adsorption pressure, with said steps being carried out in a particular manner achieving higher product purity by substantially avoiding the impurity profile reversion that can occur upon pressure equilization as discussed in the patent. It is also within the contemplation of the art to employ, in some circumstances, a fourth pressure equalization step prior to final repressurization with product effluent.

The PSA process, as represented by the disclosures of the patents, is a highly desirable and practical commercial process for the purification of hydrogen. It has the advantage of being capable of producing very high purity product, e.g. in excess of 99.9 percent pure hydrogen product. The PSA process can be used to treat a wide range of available feedstocks, and is not limited to use with a particular hydrogen-containing feed gas stream. No pretreatment or post-treatment steps are required as part of the process, other than such conventional impurity removal as may be desirable or required to avoid undue degradation of the adsorbent. In addition, there is essentially no pressure drop between the feed gas stream and the product gas so that the product gas is available at the adsorption pressure level for further use downstream of the PSA system and for repressurization of each bed to said adsorption pressure from a lower desorption level or from the intermediate pressure level achieved during one or more pressure equalization steps carried out in preferred embodiments of the invention.

While the PSA process is thus highly desirable for use in commercial applications, there are certain unfavorable aspects encountered in applying the process at very high adsorption pressures, e.g. above about 600 psig. At such high pressures, the PSA system for carrying out the process becomes relatively expensive in terms of capital investment costs. In addition, there is found to be a potentially lower recovery of product gas at such high pressure levels. Thus, more of the desired product gas tends to be stored in the bed at such high adsorption pressure levels, with said gas being discharged from the bed with the impurities during the countercurrent depressurization step. As a result, there is a desire in the art to improve the overall performance of PSA systems at pressures above about 600 psig. Such improvements would advantageously increase product recovery and reduce the overall cost of operation so as to enhance the overall technical and economic feasibility of employing the PSA process and system as in the separation and purification of hydrogen from hydrogen-containing feedstocks or off-gases available at high pressures, particularly such gas having a high concentration of impurities.

It is an object of the invention, therefore, to provide an improved overall PSA process and system for the treatment of high pressure gas streams.

It is another object of the invention to provide a PSA process and apparatus for improving the separation and recovery of hydrogen product gas from feed gas streams available at high pressures and having a high concentration of impurities.

It is a further object of the invention to provide a process and apparatus for reducing the PSA capital investment costs associated with the purification of high pressure hydrogen-containing gas streams containing a relatively large amount of impurities.

With these and other objects in mind, the invention is hereinafter described in detail, the novel features thereof being particularly pointed out in the appended claims.

SUMMARY OF THE INVENTION

The invention utilizes the highly desirable features of the PSA process and system, together with a selective permeation processing step and apparatus adapted to achieve bulk separation of impurities from a high pressure feed gas stream. Overall costs are reduced, and product recovery is improved by the use of the waste gas from the preliminary bulk separation operation, employing the selective permeation process, for power recovery and as a co-feed gas in the PSA process.

DETAILED DESCRIPTION OF THE INVENTION

The objects of the invention are accomplished by using a selective permeation technique to separate the bulk of the impurities from the desired product gas contained in the high pressure, relatively impure feed gas stream, with final separation and purification being accomplished in a PSA system with which the selective permeation apparatus is integrated as herein described and claimed. As a result, product recovery is improved without any sacrifice in desired product purity, while the overall cost of producing the desired product is reduced.

The invention can be advantageously employed in the treatment of high pressure, i.e. above about 600 psig, feed gas streams for which the PSA process and apparatus, while applicable, is disadvantaged by the high costs and relatively lower performance capabilities associated with such high pressure operations. Gas streams having a hydrogen content of up to about 90 mol percent of the feed gas are advantageous for use in the practice of the invention for hydrogen separation and purification. Those skilled in the art will appreciate, however, that gas streams containing a lower level of impurities, i.e. less than about 10 mol percent, can also be used although the overall advantages of the invention will be diminished as the purity of the feed gas stream approaches the level at which conventional PSA processing would ordinarily be employed at pressure levels below about 600 psig. While the invention is hereinafter described particularly with respect to the separation and purification of hydrogen, those skilled in the art will appreciate that the process and apparatus of the invention can be applied to any other separation/purification application wherein a feed gas stream is available at high pressure and contains a relatively large amount of impurities in addition to the desired product gas.

The feed gas stream having a hydrogen content of up to about 90 mol percent or above and available at a feed gas pressure in excess of about 600 psig is passed, in the practice of the invention, into a separator containing a gas permeable membrane capable of selectively permeating an enriched hydrogen gas stream. The non-permeate portion of the gas stream, i.e. the hydrogen-depleted impurity gas stream that does not pass through the selective membrane, is withdrawn from the separator essentially at the high feed gas pressure. This non-permeate gas will, of course, contain a substantial portion of the impurities contained in the feed gas stream. The hydrogen-rich permeate gas, i.e. the gas that passes through the gas permeable membrane, undergoes an appreciable pressure drop in passing through the membrane. As a result, the permeate gas is withdrawn from the separator at a reduced pressure. In commercial operations, the permeate will typically have a pressure reduction by a factor of from 2 to 5 as compared with the feed gas pressure to the separator. At this lower pressure level and with the bulk separation of impurities accomplished in the separator, the hydrogen-rich permeate gas can advantageously be employed as a feed gas to the PSA portion of the overall process and apparatus of the invention. Thus, the permeate gas is passed as a feed gas, at the relatively reduced pressure at which it is withdrawn from the separator after passage through the permeable membrane, to the feed end of an adsorbent bed capable of selectively adsorbing impurities from said hydrogen-rich permeate gas. A purified hydrogen product stream is withdrawn from the product end of the bed. It will be appreciated that an impurity adsorption front will advance through the bed during the feed-adsorption-product withdrawal step, as is disclosed in the Wagner and Fuderer patents referred to above.

The hydrogen-rich permeate gas is thus treated in a PSA system that is operated in accordance with conventional PSA processing techniques as disclosed in the above-indicated patents and as is otherwise known in the art. Thus, unadsorbed gas present in the void spaces between adsorbent particles at the end of the adsorption step is thereupon released from the product end of the bed, thereby cocurrently depressurizing the bed and moving the adsorption front closer toward the product end of the bed. Thereafter, the bed is countercurrently depressurized to a lower desorption pressure, thereby desorbing impurities from the bed and releasing said impurities from the feed end of the bed. The bed may be purged at its lower desorption pressure, if desired, and is thereafter repressurized from the lower desorption pressure level to the pressure level at which permeate gas is passed to the bed during the adsorption step.

The non-permeate gas available essentially at the initial high feed gas pressure level is throttled, generally for power recovery, after which the depressurized non-permeate gas or a part thereof may be passed, in accordance with the invention, to the feed end of the adsorbent bed at the adsorption pressure, as a co-feed gas, prior to the cocurrent depressurization of said bed. The hydrogen-containing high pressure feed gas treated as herein provided will commonly have a pressure of from about 600 to about 3,000 psia, more commonly from about 1,000 to about 2,000 psia. Practical applications of the invention will generally involve the use of feed gas streams having from about 40 to about 90 mol percent hydrogen, commonly from about 60 to about 90 mol percent of hydrogen. The non-permeate gas, or that portion to be used as a co-feed gas, will be throttled for use essentially at the same pressure level at which the hydrogen-rich permeate gas is passed to the PSA system or at the reduced pressure level in an adsorbent bed following cocurrent depressurization-pressure equalization in that bed. It will be understood by those skilled in the art that the most benefit can be obtained by the use of the non-permeate gas, or a portion thereof, at the adsorption pressure level. Although the use of the co-feed step at a lower, reduced pressure level, for example after cocurrent depressurization-pressure equalization, is less preferred and will tend to limit the amount of additional product recovery obtainable in the practice of the invention, the use of such co-feed after cocurrent depressurization should nevertheless be construed as falling within the overall scope of the invention as herein disclosed and claimed.

The PSA system employed will contain one or more adsorbent beds, with at least two adsorbent beds commonly being employed. It will be appreciated that the permeate gas and the non-permeate gas are passed, on a cyclic basis, to each bed at the appropriate time, as co-feed, during the processing sequence that includes adsorption at the reduced pressure level indicated, co-feed with non-permeate gas, cocurrent depressurization, countercurrent depressurization, purge and repressurization as described above. Those skilled in the art will appreciate that the PSA system will commonly contain at least three or four adsorbent beds, with the system containing up to about ten or more beds in particular embodiments depending upon the production and hydrogen purity requirements of any given application. Each bed of the system, in accordance with conventional practice, has a feed end and a product end and comprises adsorbent particles readily known and commercially available in the art for selectively absorbing impurities from the hydrogen-containing gas stream. Each bed of the system is adapted for feed gas introduction-adsorption-hydrogen product gas discharge at an adsorption pressure of from about 100 to about 1,000 psig, co-feed with non-permeate gas, cocurrent depressurization to an intermediate pressure level, countercurrent depressurization to a lower desorption pressure, purge and repressurization to said adsorption pressure as a processing sequence carried out on a cyclic basis. The system includes means for passing hydrogen-rich permeate gas at a suitable reduced pressure level from the gas permeable membrane separator to the feed end of each bed as feed gas, as well as means for discharging purified hydrogen gas from each bed and from the overall system.

The apparatus for the practice of the invention also, of course, includes a separator containing a gas permeable membrane capable of selectively permeating hydrogen at a feed gas pressure to the separator of about 600 psig or more. Means are provided for passing the feed gas stream to be treated to the feed inlet portion of the separator at said feed gas pressure. Outlet means are provided for withdrawing hydrogen-rich permeate gas from the separator at a reduced pressure. Outlet means are also provided for separately withdrawing the non-permeate portion of the gas stream from the separator essentially at the feed gas pressure. In order to recover energy available in the non-permeate gas, means are provided for reducing or throttling the pressure of said gas from the separator feed gas pressure to a lower level or levels for use as co-feed gas as herein disclosed and claimed.

Separator systems are commercially available for accomplishing the desired bulk separation of hydrogen from the impurities present in the feed gas stream. The Prism separators marketed by Monsanto Company are examples of such systems that are highly advantageous for use in the practice of the invention. Such separators contain a gas permeable membrane capable of selectively permeating hydrogen at a separator feed gas pressure in excess of about 600 psig, commonly up to about 2,000 psig or higher. Inlet means are provided for passing a hydrogen-containing feed gas at said pressure to the feed inlet portion of the separator. Outlet means are provided for withdrawing hydrogen-rich permeate gas from the separator at a reduced pressure. Other outlet means are provided for separately withdrawing the non-permeate portion of the gas stream, i.e. the portion not passing through the membrane, from the separator essentially at the feed gas pressure. In the commercially available embodiments, the permeable membrane comprises hollow fibers, commonly made from polysulfonate material, and assembled within the separator structure. The Prism separators referred to above include such hollow fibers assembled into compact bundles to provide a large membrane area available for passage therethrough of the hydrogen being separated from impurities present in the feed gas. The feed inlet portion of the separator and the non-permeate gas outlet means are conveniently in fluid communication within the separator on the outside of the hollow fibers. The permeate gas outlet means are then in fluid communication with the inside of the hollow fibers. In practical, convenient embodiments, the non-permeate gas outlet means and the permeate gas outlet means are at opposite ends of the separator, with the feed inlet means being positioned near the permeate gas outlet means. In operation, the pressurized feed gas enters the separator, and hydrogen selectively permeates the hollow fiber walls. The hydrogen-rich permeate gas passes through the interior of the fiber bores at reduced pressure and is delivered to its outlet means at one end of the separator, while non-permeate gas passes to the outlet means for such gas typically at the opposite end of the separator.

The apparatus of the invention includes conduit means for passing the hydrogen-rich permeate gas at the reduced pressure to the feed end of the PSA system, i.e. to the feed end of each bed as feed gas during the adsorption portion of the processing sequence in that bed. Conduit means are also provided for passing the non-permeate gas to the feed end of each bed at the adsorption pressure as a co-feed gas, preferably prior to the initiation of the cocurrent depressurization step in the bed. Appropriate throttling or pressure reduction means will be generally employed to recover useful power from the non-permeate gas, preferably stream so as to enhance the overall operation, with the pressure of the non-permeate gas, or portions thereof, being reduced to the desired levels for use as co-feed gas in the PSA system.

Those skilled in the art will appreciate that various changes and modifications can be incorporated into the various embodiments of the invention without departing from the scope of the invention as set forth in the appended claims. For example, the PSA system can be operated with at least one, and typically at least two adsorbent beds, as may be desirable in given applications, with from 3 to about 12 or more adsorbent beds commonly being employed in conventional practice. In multibed systems employed in the practice of the invention, the cocurrent depressurization gas released from the product end of one bed may, if desired, be passed to more than one other bed in the system for pressure equalization purposes. As is taught by the patents referred to above, two or three pressure equalization steps are commonly employed as each bed is reduced from its higher adsorption pressure ultimately to its lower desorption pressure. Cocurrent depressurization gas released from bed can also advantageously be used to provide purge gas to other beds. In common practice, cocurrent depressurization gas is used both for pressure equalization and for purge purposes.

It is also common PSA practice, and suitable for present purposes, to have the PSA system adapted for the passing of feed gas to at least two adsorbent beds in overlapping sequence at all stages of the processing cycle for the system. It will be appreciated that the overall system may employ two or more separate separator units in stages, each containing a gas permeable membrane for the bulk separation of hydrogen from the impurities in the gas stream passed to that separator. Those skilled in the art will also appreciate that, while PSA adsorbent beds of equal size are commonly employed, it is within the scope of the invention to employ a PSA system of larger and smaller beds and preliminary separator units of different size if desired to obtain processing flexibility not obtainable otherwise in particular hydrogen or other gas separation and purification operations. As in conventional practice, any suitable zeolitic molecular sieve material, such as those disclosed in the patents referred to above, or other adsorbent material capable of selectively adsorbing impurities from a hydrogen-rich permeate gas can be used in the practice of the invention. Similarly any suitable, commercially available gas permeable membrane material capable of selectively permeating hydrogen may be employed in the preliminary separator unit. Those skilled in the art will appreciate that the process and apparatus of the invention can be used for PSA separation and purification operations other than that pertaining to hydrogen, such as air purification, upon the availability of gas permeable membranes capable of selectively permeating one component of a feed gas mixture prior to the passage of the feed gas mixture to an appropriate PSA system.

In the illustrative practice of the invention, an off-gas containing about 70% hydrogen together with methane, nitrogen and other impurities is passed to a Prism separator at a pressure of about 1500–1600 psig. A hydrogen-rich permeate gas is withdrawn from the separator at a reduced pressure about 500 psig. The permeate gas has an enriched hydrogen concentration of about 95 mol %. The non-permeate portion of the feed gas stream is separately withdrawn from the separator essentially at the feed gas pressure. The hydrogen-rich permeate gas is passed to a PSA system at its reduced pressure for further purification of the hydrogen content thereof. The permeate gas is passed to each bed of the PSA system on a cyclic basis, with each bed undergoing the customary processing sequence of feed-adsorption-hydrogen product withdrawal, co-feed with non-permeate gas, cocurrent depressurization with the gas released from the product end of each adsorbent bed being used for pressure equalization with other beds, countercurrent depressurization to a lower desorption pressure of about 10 psig, purge and repressurization to the adsorption pressure level at which the permeate gas is passed to said PSA system. The non-permeate gas is throttled to said adsorption pressure level and is passed, in appropriate processing sequence to the feed end of each bed, upon completion of the adsorption step, as a co-feed prior to the cocurrent depressurization step in said bed. A portion of the non-permeate gas can be diverted for use as fuel or for other purposes as desired. High purity hydrogen product having a hydrogen concentration in excess of 99% is withdrawn from the PSA system at the adsorption pressure level, while waste gas is withdrawn from the system at the lower desorption pressure of about 10 psig. By inclusion of the co-feed step of the invention, additional unadsorbed void space gas is displaced from each adsorbent bed thereby so as to enhance product recovery from that bed and from the overall system. By comparison, if the feed gas were processed in the PSA system alone at the adsorption pressure, the recovery in the PSA unit would be lower even after cocurrent depressurization and product recovery as a substantial amount of void space gas remains in the bed at this point and is lost as product by discharge from the feed end of the bed during the countercurrent depressurization and purge steps. In a conventional PSA system apart from the invention, a large number of pressure equalization steps would be required in order to increase recovery, but this would necessitate the incorporation of an unnecessarily large number of adsorption vessels in the system. The combined operation of the invention, it will be understood, not only provides for relatively high product recovery but also enables a substantial recovery of waste gas to be achieved at relatively high pressures such that said waste gas is useful as fuel. If, on the other hand, the feed gas were processed at the feed pressure in the Prism unit alone, product purity and recovery would both be lower than that obtained in the practice of the invention.

The permeable membrane separator is thus employed for bulk separation of the feed gas stream that has a relatively high concentration of impurities, while the PSA system is employed for final separation/purification to produce the desired high purity hydrogen product. The overall integrated process of the invention thus takes advantage of the PSA system and of the permeable membrane separation system for the advantageous features of each in a manner effectively accommodating or utilizing the disadvantages of each with respect to the treatment of gas streams having a high impurity content and that are available at very high pressures. While the conventional PSA system is able to handle a wide variety of feedstocks or off-gases and produces desired product at the adsorption pressure of the system, the relatively high investment costs and relatively lower recovery associated with the treatment of gas streams at pressures above about 600 psig makes the combined operation of the invention highly desirable for the treatment of such gas streams. The permeable membrane separation system, on the other hand, is relatively inexpensive, with the cost thereof not sensitive to pressure, and operates well at pressures above about 600 psig. While the hydrogen-rich permeate gas is not recovered at the high purity levels of the PSA system and is subject to a large pressure drop in passing through the permeable membrane, it is nevertheless obtained at a reduced pressure level, after bulk separation from impurities, as a desirable feed gas for the PSA system and at an acceptable pressure level for such system. The avoiding of the potentially lower product recovery encountered in PSA systems operated at above 600 psig contributes further to the overall cost and technical advantages resulting from the recited combination of the permeable membrane separation system with the PSA system.

The high pressure, crude feed gas stream passed to the overall integrated system of the invention can be processed in the permeable membrane separation system without any major pre- or post-processing treatment, other than for removal of any impurities that may attack the permeable membrane material. The permeable membrane separator is preferably operated so that the bulk separation is achieved under relatively mild conditions such that maximum hydrogen recovery is achieved. For this purpose, a relatively low pressure drop, but nevertheless to a pressure less than about 1,000 psi, and acceptance of a low hydrogen purity in the permeate gas, but nevertheless hydrogen-enriched as compared to the feed gas, is preferably desired. The non-permeate gas is, in any event, withdrawn from the separator at the higher pressure, and is useful both as a co-feed gas for the PSA unit and as a relatively high pressure fuel or feed gas for other operations. By throttling this gas through an appropriate means, such as a turbine, desirable power recovery can be readily achieved. By the use of a portion of the resulting, reduced pressure non-permeate gas in accordance with the practice of the invention, as co-feed to the PSA system, the recovery of hydrogen in the PSA system, and overall hydrogen recovery, is improved as compared to the hydrogen recovery previously obtainable by direct processing of low purity, high pressure off-gasses or other hydrogen-containing feedstocks. The invention thereby enhances the separation and purification of hydrogen by means of PSA processing and effectively extends the range of available feed streams that can be effectively and economically treated for hydrogen recovery in practical commercial operations.

What is claimed is:

1. An improved pressure swing adsorption process for the separation and purification of hydrogen contained in a high pressure feed gas stream comprising:
   (a) passing said feed gas stream having a hydrogen content of up to about 90 mol % at a feed gas pressure in excess of about 600 psig into a separator containing a gas permeable membrane capable of selectively permeating said hydrogen;
   (b) withdrawing the non-permeate portion of said gas stream from the separator essentially at the feed gas pressure, said non-permeate gas containing a substantial portion of said impurities;
   (c) withdrawing the hydrogen-rich permeate gas from the separator at a reduced pressure;
   (d) passing said hydrogen-rich permeate gas as a feed gas at said reduced pressure to the feed end of an adsorbent bed capable of selectively adsorbing impurities from said permeate gas, said bed thereby having an advancing impurity adsorption front therein, with unadsorbed, purified hydrogen product gas being withdrawn from the product end of the bed;
   (e) releasing void space gas from the product end of the bed, thereby cocurrently depressurizing said bed and moving said adsorption front toward said product end of the bed;
   (f) countercurrently depressurizing the bed to a lower desorption pressure to desorb and release said impurities from the feed end of the bed;
   (g) repressurizing said bed from the lower desorption pressure to said pressure level at which permeate gas is passed to the bed;
   (h) depressurizing said non-permeate gas or a portion thereof from said feed gas pressure;
   (i) passing depressurized non-permeate gas to the feed end of the adsorbent bed at said reduced pressure as a co-feed gas, prior to step (e) above; and
   (j) repeating said steps (a)-(i) with additional quantities of said feed gas stream,
whereby product recovery can be enhanced at reduced operating costs.

2. The process of claim 1 in which said feed gas pressure is from about 600 to about 3,000 psig.

3. The process of claim 2 in which said feed gas pressure is from about 1,000 to about 2,000 psig.

4. The process of claim 1 in which the hydrogen content of said gas stream is from about 40 to about 90 mol %.

5. The process of claim 1 in which said permeate gas and said non-permeate gas are passed, on a cyclic basis, to at least two adsorbent beds, each of which undergoes adsorption at said reduced pressure, co-feed with non-permeate gas at such reduced pressure, cocurrent depressurization, countercurrent depressurization, purge and repressurization.

6. The process of claim 5 in which from about 3 to about 12 adsorbent beds are employed.

7. The process of claim 4 in which said feed gas pressure is from 600 to about 3000 psig.

8. The process of claim 3 in which said reduced pressure is less than about 1000 psig.

9. An improved pressure swing adsorption apparatus for the separation and purification of hydrogen contained in a high pressure gas stream comprising:
   (a) a separator containing a gas permeable membrane capable of selectively permeating said hydrogen at a separator feed gas pressure in excess of about 600 psig;
   (b) means for passing said gas stream at said feed gas pressure to the feed inlet portion of said separator;
   (c) outlet means for withdrawing hydrogen-rich permeate gas from the separator at a reduced pressure;
   (d) outlet means for separately withdrawing the non-permeate portion of the gas stream from the separator essentially at said feed gas pressure;
   (e) a pressure swing adsorption system having at least one adsorbent bed therein, said adsorbent bed having a feed end and a product end and being capable of selectively adsorbing impurities from a hydrogen-containing gas stream, said adsorption system being adapted for feed gas introduction-adsorption-hydrogen product gas discharge at said reduced pressure, co-feed with non-permeate gas, cocurrent depressurization to an intermediate pressure level, countercurrent depressurization to a lower desorption pressure, purge and repressurization to said adsorption pressure in each bed, on a cyclic basis;
   (f) means for passing said hydrogen-rich permeate gas at said reduced pressure to the feed end of each bed as feed gas;
   (g) means for reducing the pressure of said non-permeate gas from said separator feed gas pressure to a lower level(s); and
   (h) conduit means for passing said non-permeate gas to the feed end of each said bed at a reduced pressure as a co-feed gas prior to said cocurrent depressurization of each said bed,
whereby the integration of the processing streams from said separator with said pressure swing adsorption system enables overall hydrogen product recovery to be enhanced at reduced operating costs.

10. The apparatus of claim 9 in which said permeable membrane comprises hollow fibers assembled within the separator.

11. The apparatus of claim 10 in which said feed inlet portion and the non-permeate gas outlet means are in fluid communication within said separator on the outside of said hollow fibers, said permeate gas outlet means being in fluid communication with the inside of said hollow fibers.

12. The apparatus of claim 11 in which said non-permeate gas outlet means and said permeate gas outlet means are at opposite ends of the separator, said feed inlet means being positioned near said permeate gas outlet means.

13. The apparatus of claim 9 in which said adsorption system comprises at least two adsorbent beds.

14. The apparatus of claim 13 in which said adsorption system comprises from 3 to about 12 adsorbent beds.

15. The apparatus of claim 14 in which said adsorption system is adapted for the passing of feed gas to at least two adsorbent beds at all stages of the processing cycle for said system.

* * * * *